United States Patent [19]

Busboom et al.

[11] Patent Number: 4,546,600
[45] Date of Patent: Oct. 15, 1985

[54] HEADER PIVOT SUPPORT

[75] Inventors: Garry W. Busboom, Independence, Mo.; Larry R. James, Olathe, Kans.

[73] Assignee: Allis-Chalmers Corp., Milwaukee, Wis.

[21] Appl. No.: 583,008

[22] Filed: Feb. 23, 1984

[51] Int. Cl.[4] ............................................. A01D 35/12
[52] U.S. Cl. ...................................... 56/208; 56/14.6; 56/15.6; 56/DIG. 9
[58] Field of Search .......... 56/14.6, 208, 228, DIG. 9, 56/15.6, 15.9

[56] References Cited

U.S. PATENT DOCUMENTS

| | | | |
|---|---|---|---|
| 3,665,688 | 5/1972 | Sheehan et al. | 56/14.6 |
| 4,197,693 | 4/1980 | Bernhardt et al. | 56/14.6 |
| 4,280,317 | 7/1981 | Lindblom et al. | 56/208 |

Primary Examiner—Robert P. Swiatek
Assistant Examiner—David L. Tarnoff
Attorney, Agent, or Firm—Charles L. Schwab

[57] ABSTRACT

A mobile agricultural harvester has a crop header connected to the harvester main frame for vertical swinging movement by a pair of pivot collars held against a pair of upright posts by releasable fasteners.

9 Claims, 8 Drawing Figures

U.S. Patent    Oct. 15, 1985    Sheet 1 of 3    4,546,600
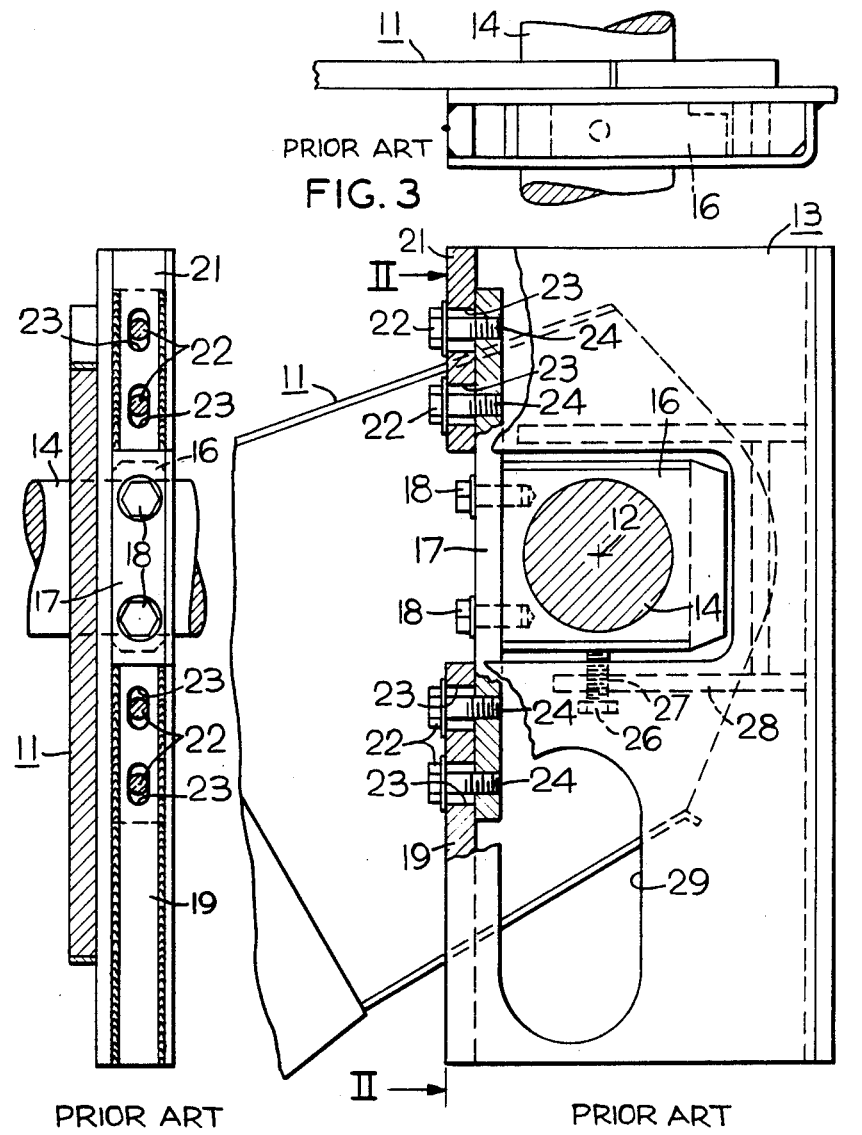
PRIOR ART
FIG. 3
PRIOR ART
FIG. 2
PRIOR ART
FIG. 1
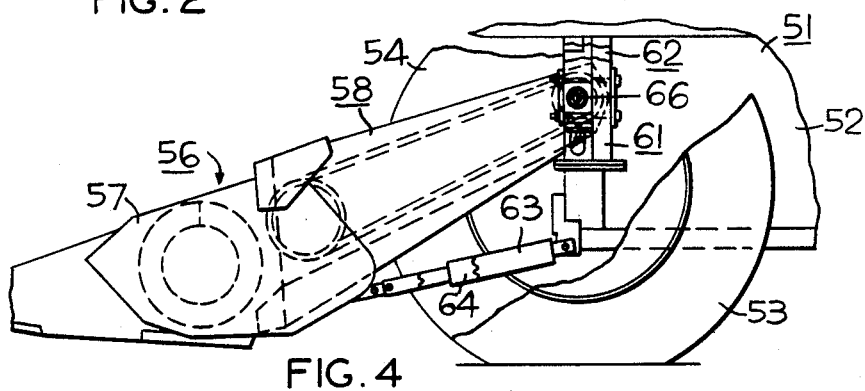
FIG. 4

HEADER PIVOT SUPPORT

TECHNICAL FIELD

This invention relates to a mobile agricultural harvester or combine of the type having a crop header at its forward end which is pivotally mounted at the front of the combine for vertical swinging movement about a transverse axis to achieve the desired harvesting height of the header.

BACKGROUND OF THE INVENTION

Heretofore, others have manufactured and sold combines having crop headers whose harvesting height is adjusted through pivotal movement about a transverse axis. The pivot support for the header usually includes a pair of laterally spaced pivot supports at opposite sides of the upper rear end of the conveyor portion of the header. Heretofore, the pivot connections have been vertically adjustable so as to level the header in relation to the ground. One such adjustable connection is illustrated in FIGS. 1 through 3 of the attached drawings which are hereinafter described in the detailed description of the drawings.

SUMMARY OF THE INVENTION

The present invention has utility in a mobile agricultural harvester of the type including a main frame and a crop header at its forward end. A pair of laterally spaced upright posts are provided at the front of the main frame which present a pair of flat mounting surfaces lying substantially in a transverse vertical plane. The pivot connection between the crop header and the main frame, which permits vertical swinging movement of the crop header about a transverse pivot axis, includes a pair of pivot collars with radially inward facing cylindrical surfaces defining aligned bores engaging a pair of complementary bearing components, respectively. The pivot collars have front and rear thrust surfaces lying in longitudinally spaced parallel vertical planes. A pair of vertically disposed thrust plates have rearwardly facing flat faces in thrust transmitting engagement with the front thrust surfaces, respectively, of the pivot collars. The post and thrust plates have aligned longitudinal openings on axes disposed above and below the pivot collars and receive upper and lower releasable tension members which are operative to exert rearward thrust against the thrust plate to cause the pivot collars to be held against the respective mounting surfaces of the posts with sufficient force to prevent relative movement between the collars and posts. The tension members are spaced vertically from their associated pivot collars to permit vertical adjustment of the collars relative to the posts. Upper and lower abutments may be formed on the main frame forwardly of each of the posts and near the front ends of the pivot collars. The upper abutment being in downward thrust transmitting relation to the upper tension member and the lower abutment being in upward thrust transmitting relation to the lower tension member. These abutments prevent the tension members from deflecting in a vertical direction. A mechanism for adjusting the vertical position of the pivot collar in relation to the associated post may be provided which includes a U-shaped thrust member having a web or base and a pair of laterally spaced flanges extending upwardly from the base and disposed on laterally opposite sides of the associated lower tension member. The flanges have their upper ends in vertical thrust transmitting engagement with the underside of the pivot collar. Interposed between the frame and the web of the U-shaped thrust member is an adjustment means operable to vertically adjust the U-shaped thrust member and pivot collar relative to the associated post when the tension members associated with the pivot collar are released.

An object of the present invention is to provide adjustable pivot connections permitting the header to be easily connected to and disconnected from the harvester main body.

It is an object of the present invention to provide a mounting for a pivot collar for a header pivot connection which allows the collar to swing about a longitudinal axis during vertical adjustment of the collar.

BRIEF DESCRIPTION OF THE DRAWINGS

Both a prior art construction and one embodiment of the invention are shown in the drawings wherein:

FIG. 1 is a side view of an adjustable header pivot connection of prior art construction;

FIG. 2 is a view taken along the line II—II in FIG. 1;

FIG. 3 is a top view of the construction shown in FIG. 1;

FIG. 4 is a side view of a front portion of a combine incorporating the present invention;

DETAILED DESCRIPTION OF THE DRAWINGS

Prior Art

Figures 5, 6:
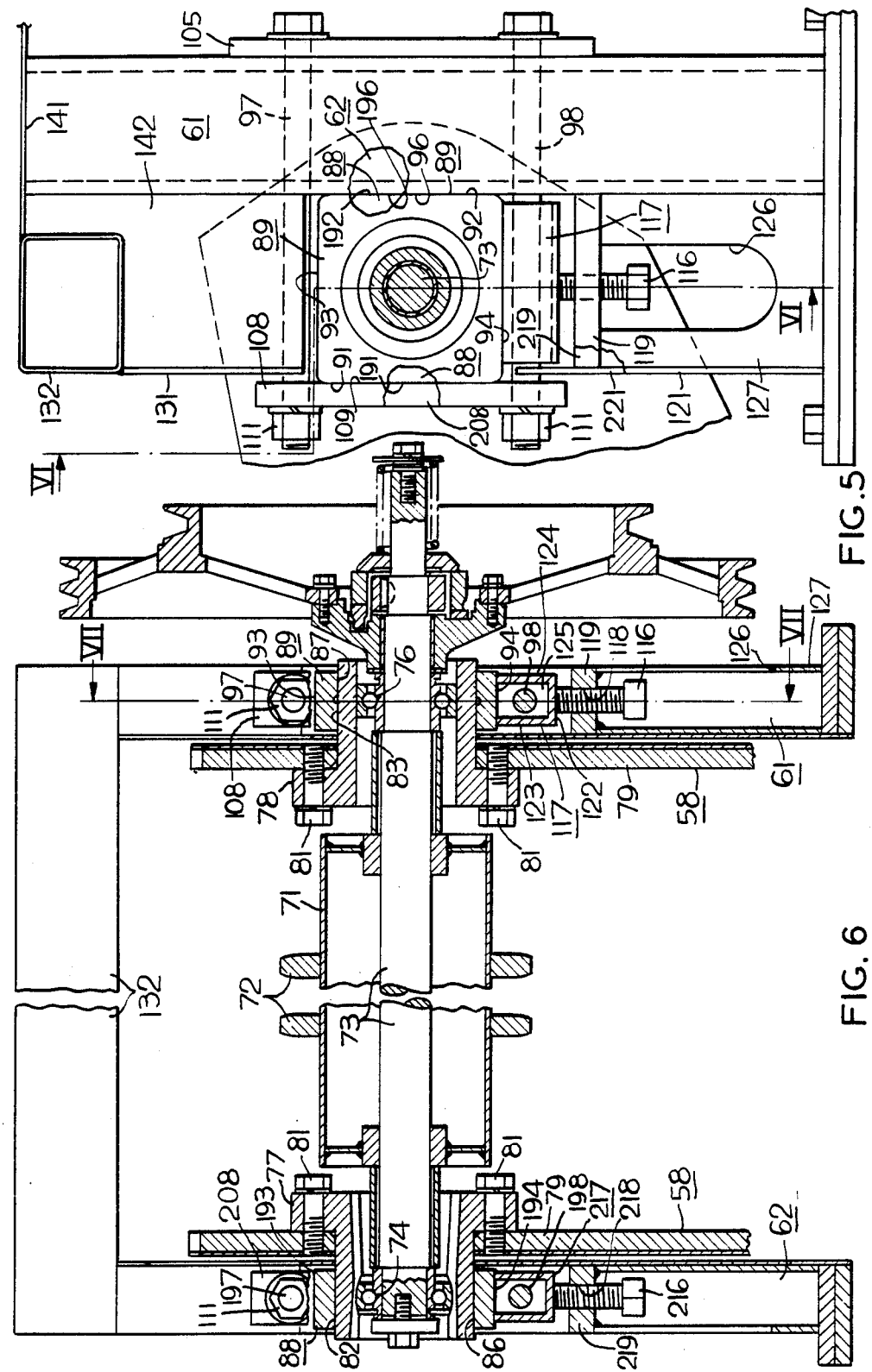
FIG. 5 is an enlarged side view of the pivot connection between the header and the combine main frame as illustrated in FIG. 4.
FIG. 6 is a view taken along the line VI—VI in FIG. 5.

FIGS. 1, 2 and 3 illustrate a prior art pivot connection for a crop header of a combine used in combines manufactured by Allis-Chalmers Corporation, the assignee of the present invention. In this prior art construction, the crop header 11 is pivotally connected on a transverse pivot axis 12 to the main frame of the combine by a pivot support which includes a pair of posts 13, only one of which is shown in the drawings. A transverse shaft 14 of the header 11 is connected to the posts 13, at the laterally opposite side thereof by pivot collars or blocks 16, only one of which is illustrated. The pivot block 16 is secured to a vertically disposed plate 17 by a pair of capscrews 18. The plate 17 is releasably and adjustably secured to the front wall segments 19, 21 of the post 13 by four capscrews 22 extending through vertically elongated slots 23 and into drilled and tapped openings 24 in the plate 17. The pivot collar 16 may be adjusted vertically, upon release of the capscrews 22, by turning a capscrew 26 which is threaded into a drilled and threaded opening 27 in a horizontal bracket 28. The upper end of the capscrew 26 bears against the bottom side of the pivot collar 16. An opening 29 in the side wall of the post 13 provides access to the capscrew 26.

Description of the Invention

One embodiment of the invention is shown in FIGS. 4–8. Referring specifically to FIG. 4, a mobile agricultural harvester or combine 51 includes a main frame 52 supported at its front end by a pair of laterally spaced drive wheels 53, 54. A crop header 56 includes a platform 57 releasably secured to a rearwardly extending elevating conveyor part 58, the rear end of which is pivotally connected to a pair of laterally spaced vertical posts 61, 62 on opposite lateral sides of the conveyor part 58. The posts 61, 62 are rigidly secured to the front end of the main frame 51. The height of the header 56 is adjusted by actuation of hydraulic jacks 63, 64 interposed between the main frame 51 and the header 56, which causes the header to swing about a transverse pivot axis 66.

The conveyor part 58 includes a conveyor drive drum 71 with sprockets 72 and a shaft 73 rotatably supported by antifriction bearings 74, 76. The bearings 74, 76 are mounted in annular bearing components in the form of pivot bushings 77, 78 which are secured to the conveyor housing 79 of the feeder part 58 by capscrews 81. The radially outward facing cylindrical bearing surfaces 82, 83 of the bushings 77, 78 are in pivotal bearing engagement with radially inward facing cylindrical bearing surfaces 86, 87 formed in pivot collars 88, 89.

Figures 7, 8:
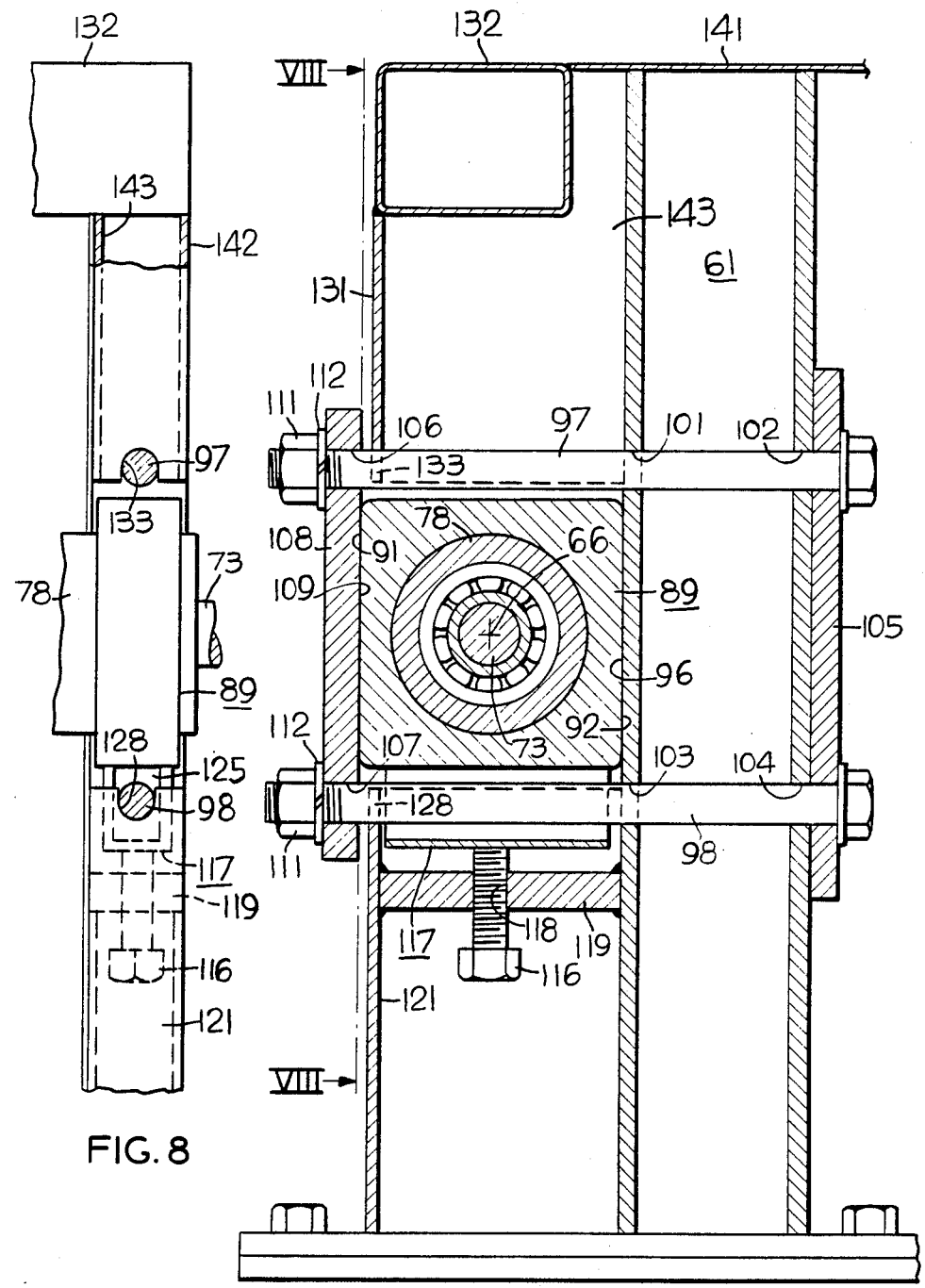
FIG. 7 is a view taken along the line VII—VII in FIG. 6.
FIG. 8 is a view taken along the line VIII—VIII in FIG. 7.

Referring to FIGS. 5, 6 and 7, the pivot collars 88, 89 have flat front and rear parallel vertical surfaces 91, 92, 191, 192 and horizontal top and bottom surfaces 93, 94, 193, 194. The rear thrust surfaces 92, 192 lie in a common vertical plane and are held against flat vertical mounting surfaces 96, 196 on the front of hollow, rectangular section posts 61, 62 by two pair of longitudinally disposed parallel tension members in the form of upper tension bolts 97, 197 and lower tension bolts 98, 198. As shown in FIGS. 5 and 7, the upper bolt 97 extends through longitudinally aligned openings 101, 102 in the front and rear walls of the post 61 and the lower bolt 98 extends through longitudinally aligned openings 103, 104 in the front and rear walls of the post 61. The bolts 97, 98 also extend through openings in a spacer bar 105 at the head ends of the bolts and through longitudinal openings 106, 107 in a vertically disposed thrust plate 108 which has a flat vertical surface 109 in longitudinal thrust transmitting engagement with the front surface 91 of the pivot collar 89. Nuts 111 and lockwashers 112 cooperate with bolts 97, 98 and the thrust plate 108 to exert sufficient rearward thrust against the pivot collar 89 to maintain the vertical position of the latter on the post 61. Similarly, tension bolts 197, 198 hold a thrust plate 208 against the front surface 191 of the pivot collar 88 so as to maintain its rear thrust surface 192 against the mounting surface 196 of the post 62. The bolts 97, 197, 98, 198 are spaced vertically from the tops and bottoms of the pivot collars 88, 89 so as to permit the pivot collars 88, 89 to be adjusted vertically relative to the posts 61, 62, upon loosening nuts 111 on the tension bolts, by vertical adjustment means in the form of capscrews 116, 216 and U-shaped thrust members 117, 217. The capscrews 116, 216 threadedly engage drilled and tapped openings 118, 218 in brackets 119, 219 secured by welding to the posts 62, 61 and to vertical walls 121, 221. As shown in FIG. 6, the U-shaped thrust member 117 includes a bottom web 122 and wall means in the form of a pair of vertical flanges 123, 124 on laterally opposite sides of the bolt 98 which define a longitudinal opening 125 through which bolt 98 extends. The upper ends of the flanges 123, 124 are in vertical thrust transmitting engagement with the bottom surface 94 of the pivot collar 89. An opening 126 is provided in a laterally outer side wall 127 to provide access to the adjusting screw 116. The vertical wall 121 extends upwardly in front of the U-shaped thrust member 117 near the rear of the thrust plate 108 and provides an upward facing abutment in the form of a semi-cylindrical surface 128 which serves to prevent downward deflection of the front end of the lower tension bolt 98. A vertical wall 131 is welded at its upper end to one end of a transverse beam 132 extending between the posts 61, 62 and presents a downwardly facing abutment in the form of a semi-cylindrical surface 133 in downward thrust transmitting engagement with the upper tension bolt 97 thereby preventing upward deflection of the forward end of the bolt 97. Since the openings 106, 107 in the thrust plate 108 fix the vertical spacing of the front ends of the tension bolts 97, 98 and the abutment surfaces 128, 133 prevent downward and upward movement of the front ends of the bolts 97, 98, respectively, the front ends of the bolts are held against vertical deflection.

The transverse reinforcing beam 132 is secured to post 61 by a horizontal plate 141 which is welded to the beam 132 and to the top of the post 61 and by a pair of laterally spaced vertical plates 142, 143 welded to the beam 132, to the front wall 131 and to the post 61.

The connection between the pivot collar 88 and its support post 62 is a reverse image of the connection between the pivot collar 89 and its support post 61.

OPERATION

The platform 57 of the header 56 is normally not connected to the conveyor part 58 during shipment from the factory to the dealer or customer. Upon installation of the platform 57, it may be necessary to adjust one of the pivot collars vertically to level the header relative to the ground.

This is accomplished by loosening the nuts 111 associated with one pair of tension bolts such as bolts 97, 98 and then screwing the adjustable abutment means in the form of capscrew 116 up or down to move the pivot block 89 up or down the desired amount. The nuts 111 only need be loosened enough to permit the pivot collar 89 to slide up or down relative to the post 61 and to the thrust plate 108. Even though some frictional contact may occur between the surface 91 of the pivot collar 89 and the surface 109 of the thrust plate 108, the front ends of the tension bolts will not deflect vertically because they are restrained by the abutments 128, 133 and the thrust plate 108. Deflection of the front ends of the tension bolts would cause an undesired wedging action between the thrust plate 108 and the pivot collar 89, making it more difficult to slide the pivot collar 89 up or down during adjustment thereof.

During vertical adjustment of pivot collar 89, for instance, the pivot collar 89, the bushing 78 and the shaft 73 will swing about a generally longitudinal axis passing through the connection between the pivot collar 88 and its post 62. In the present invention, the pivot collars are not constrained to translational vertical movement as in the illustrated prior art connection. (The slots 23 force the collar 16 of the prior art structure to follow a vertical path during adjustment.)

The vertical flanges of the U-shaped thrust members 117, 217 are spaced laterally from the associated lower tension bolts 98, 198 so as not to interfere with vertical adjustment of the pivot collars. In event it is desired to disconnect the feeder conveyor part 58 of the header 56 from the main frame 51 the nuts 111, lockwashers 112 and thrust plates 108, 208 are removed and then the pivot collars 88, 89 can be separated from the posts 61, 62 without disassembly from the shaft 73 or from bushings 77, 78. In such a disconnecting operation it would also be necessary to disconnect the hydraulic jacks 63, 64 and other items such as drive belts.

The embodiments of the invention in which an exclusive property or privilege is claimed are defined as follows:

1. In a mobile agricultural harvester including main frame and crop header at its forward end, the combination comprising:

a pair of laterally spaced upright posts at the front of said main frame presenting a pair of flat forward facing mounting surfaces lying in a transverse vertically extending plane, a pivot connection between said crop header and said main frame permitting vertical swinging movement of said crop header about a transverse pivot axis, said pivot connection including a pair of axially spaced bearing components presenting radially outward facing cylindrical bearing surfaces aligned on said transverse axis and a pair of pivot collars with cylindrical surfaces defining aligned bores engaging said bearing surfaces of said pivot bushings, respectively, said pivot collars having rear thrust surfaces in rearward thrust transmitting engagement with said flat mounting surfaces on said posts, respectively, upper and lower releasable tension members interconnecting each of said pivot collars to its associated post, said tension members extending longitudinally above and below said pivot collars, respectively, and exerting rearward thrust to cause the pivot collars to be held against the respective mounting surfaces of said posts with sufficient force to prevent relative movement between said collars and posts, said tension members being spaced vertically from their associated pivot collars to permit vertical adjustment of the latter relative to said posts upon release of said tension members and a mechanism for adjusting the vertical position of said pivot collar in relation to the associated post including a U-shaped thrust member having a base and a pair of laterally spaced flanges extending upwardly from said base and disposed on laterally opposite sides of the associated lower tension member, said flanges having upper ends in vertical thrust transmitting engagement with the underside of said pivot collar, and adjustment means interposed between said frame and said base operable to adjust said U-shaped thrust member and pivot collar vertically relative to the associated post when said tension members associated with said collar are released.

2. The harvester of claim 1 wherein said pivot connection includes a thrust plate engaging the front of each pivot collar and wherein said tension members have their forward ends connected to said thrust plates.

3. The harvester of claim 2 and further comprising upper and lower abutments on said main frame forwardly of each of said posts near the front ends of said pivot collars in downward thrust transmitting relation to said upper tension members and in upward thrust transmitting relation to said lower tension members, respectively.

4. The harvester of claim 1 wherein said frame includes a generally horizontal bracket beneath said U-shaped thrust member presenting a threaded vertical opening and wherein said adjustment means includes a screw in threaded engagement with said threaded opening and having an end in vertical thrust transmitting engagement with said base.

5. In a mobile agricultural harvester including main frame and crop header at its forward end, the combination comprising:

a pair of laterally spaced upright posts at the front of said main frame presenting a pair of flat mounting surfaces lying in a transverse vertically extending plane, a pivot connection between said crop header and said main frame permitting vertical swinging movement of said crop header about a transverse pivot axis, said pivot connection including a pair of axially spaced pivot bushings presenting radially outward facing cylindrical bearing surfaces aligned on said transverse axis and a pair of pivot collars with cylindrical surfaces defining aligned bores engaging said bearing surfaces of said pivot bushings, respectively, said pivot collars having front and rear thrust surfaces lying in longitudinally spaced parallel vertical planes, a pair of vertically disposed thrust plates having rearwardly facing flat faces in thrust transmitting engagement with the front thrust surfaces, respectively, of said pivot collars, aligned longitudinal openings in said posts and thrust plates on axes disposed above and below said pivot collars, upper and lower releasable tension members extending through said openings and operative to exert rearward thrust against said thrust plates to cause the pivot collars to be held against the respective mounting surfaces of said posts with sufficient force to prevent relative movement between said collars and posts, said tension members being spaced vertically from their associated pivot collars to permit vertical adjustment of the latter relative to said posts, and vertical wall means on said frame forwardly of said flat mounting surfaces of said posts presenting first upwardly facing abutments in upward thrust transmitting relation to portions of said lower tension members near the associated thrust plates and presenting second downward facing abutments in downward thrust transmitting relation to portions of said upper tension members near the associated thrust plates, said abutments and thrust plates preventing vertical deflection of the forward ends of said tension members.

6. The harvester of claim 5 and further comprising means operable to vertically adjust said pivot collars relative to said posts, respectively, when said tension members are released including a pair of vertically adjustable thrust members mounted on said frame and in vertical thrust transmitting relation to said collars, respectively.

7. The harvester of claim 6 wherein said vertically adjustable thrust members are screws and said frame includes a pair of horizontal brackets rigidly secured, respectively, at their front ends to said vertical wall means presenting said upwardly facing abutments and at their rear ends to said posts, respectively, said brackets including threaded vertical openings in threaded engagement with said screws.

8. The harvester of claim 7 and further comprising a pair of U-shaped thrust members disposed, respectively, between said pivot collars and said screws, each of said U-shaped thrust members having a pair of upwardly extending flanges in vertical thrust transmitting engagement with the associated pivot collar, said flanges being disposed on laterally opposite sides of the associated lower tension member.

9. In a mobile harvester including a main frame and crop header at its forward end, support means between said crop header and said main frame permitting vertical swinging movement of said crop header about a transverse axis comprising:
  an upright post at the front of said main frame, said post including longitudinally spaced front and rear walls, said front wall presenting a flat forward facing mounting surface,
  an annular bearing component on said header disposed on said transverse axis,
  a pivot collar encompassing and supporting said bearing component including a flat rear thrust surface in rearward thrust transmitting relation to said mounting surface on said front wall of said post,
  upper and lower releasable tension members securing said pivot collar to said post whereby said thrust surface engages said mounting surface, said lower tension member being spaced vertically below said pivot collar, and
  a mechanism for adjusting the vertical height of said pivot collar in relation to said post including
    a thrust member in vertical thrust transmitting engagement with the underside of said pivot collar, said thrust member having wall means defining a longitudinal opening through which said lower tension member freely extends and
    a vertically adjustable abutment element mounted on said main frame beneath said thrust member and presenting an upper end in vertical thrust transmitting engagement with the underside of said thrust member, said abutment element being operable to vertically adjust said pivot collar when said tension members are released.

* * * * *